United States Patent
Seko

(10) Patent No.: US 10,710,419 B2
(45) Date of Patent: Jul. 14, 2020

(54) SENSING ASSEMBLY FOR DETECTION OF TEMPERATURE OF TIRE

(71) Applicant: Honda Motor Co., Ltd., Tokyo (JP)

(72) Inventor: Shigeyuki Seko, Campbell, CA (US)

(73) Assignee: Honda Motor Co., Ltd., Tokyo (JP)

( * ) Notice: Subject to any disclaimer, the term of this patent is extended or adjusted under 35 U.S.C. 154(b) by 163 days.

(21) Appl. No.: 16/005,332

(22) Filed: Jun. 11, 2018

(65) Prior Publication Data

US 2019/0375255 A1 Dec. 12, 2019

(51) Int. Cl.
*B60C 23/00* (2006.01)
*B60C 23/04* (2006.01)
(Continued)

(52) U.S. Cl.
CPC ............ *B60C 23/20* (2013.01); *B60C 23/005* (2013.01); *B60C 23/006* (2013.01);
(Continued)

(58) Field of Classification Search
CPC .. G01M 17/02; G01M 17/021; G01M 17/022; G01M 17/027; G01M 17/025; G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/40; G01M 5/0091; G01M 7/02; G01M 99/00; G01M 99/002; B60C 23/0494; B60C 2019/004; B60C 23/0493; B60C 19/00; B60C 23/04; B60C 23/0498; B60C 23/064; B60C 23/0488; B60C 23/0496; B60C 23/0408; B60C 23/041; B60C 23/0411; B60C 23/20; B60C 23/0486; B60C 23/06; B60C 11/243; B60C 11/246; B60C 23/061; B60C 99/00; B60C 11/0083; B60C 13/003; B60C 2009/2038; B60C 23/00; B60C 23/003; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04;
(Continued)

(56) References Cited

U.S. PATENT DOCUMENTS

| 6,360,594 B1 * | 3/2002 | Koch | B60C 5/004 73/146.5 |
| 2014/0180534 A1 * | 6/2014 | Son | B60C 23/20 701/34.4 |

FOREIGN PATENT DOCUMENTS

| DE | 102016200501 A1 | 7/2017 |
| JP | 3635837 B2 | 4/2005 |
| JP | 4485628 B2 | 6/2010 |

* cited by examiner

*Primary Examiner* — Andre J Allen
(74) *Attorney, Agent, or Firm* — Honda Patents & Technologies North America, LLC; Clifford B Vaterlaus

(57) ABSTRACT

A sensing assembly for detecting a temperature of a tire of a vehicle comprises a fender, one or more cavities, and at least one contactless temperature sensor. The fender comprises an outer surface and an inner surface. The inner surface of the fender defines the one or more cavities. The contactless temperature sensor is seated within each of the one or more cavities. Further, the contactless temperature sensor is configured to detect the temperature of the tire of the vehicle.

20 Claims, 3 Drawing Sheets

(51) Int. Cl.
*B60C 23/20* (2006.01)
*G06K 19/07* (2006.01)
*B60R 21/01* (2006.01)

(52) U.S. Cl.
CPC ...... *B60C 23/0408* (2013.01); *G06K 19/0717* (2013.01); *B60R 2021/01088* (2013.01); *B60R 2021/01184* (2013.01)

(58) Field of Classification Search
CPC ... B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/001; B60C 23/007; B60C 23/008; B60C 23/0413; B60C 23/0427; B60C 23/0447; B60C 23/0454; B60C 23/0457; B60C 23/0462; B60C 23/0467; B60C 23/0471; B60C 23/0472; B60C 23/0476; B60C 23/0479; B60C 23/0484; B60C 23/065; B60C 23/066; B60C 23/10; B60C 25/0548; B60C 25/056; B60C 25/132; B60C 25/138; B60C 25/18; B60C 29/005; B60C 9/005; B60C 9/18; B60C 9/1807; B60C 9/20; B60C 9/28
USPC .................................. 73/146–146.8
See application file for complete search history.

SENSING ASSEMBLY FOR DETECTION OF TEMPERATURE OF TIRE

TECHNICAL FIELD

The present disclosure generally relates to sensing devices for vehicles. More particularly, the present disclosure relates to a sensing assembly for detecting temperature of a tire of a vehicle.

BACKGROUND

Tire surveys conducted by various agencies suggest that pressure and temperature of a tire are interdependent and invariably contribute to longevity of the tire. Typically, tire inflation pressure is maintained within ranges recommended or specified by the manufacturer. Excessive tire pressure or over-inflation of the tire leads to reduced braking performance, uneven wear, and eventually failure or a blowout. Alternately, under-inflation or low tire pressure leads to reduced fuel economy, increased emissions, and premature tire failure. As such, it is desirable that an optimal inflation pressure be maintained to improve longevity of the tire. Considering the dynamic variation in temperature and pressure of the tire, a device, which in real time detects the temperature of the tire of the vehicle, is required.

Over the years, several sensing systems have been devised to determine temperature of tires accurately. However, existing tire-temperature detection systems suffer from a variety of drawbacks. For instance, in conventional systems, a temperature sensor in contact with the tire is configured to detect temperature of points or specific sections of the tire proximal to the temperature sensor. The temperature thus measured, would not provide an accurate temperature that is representative of sections of the tire distal to the sensor. Furthermore, contact temperature sensors of existing systems are exposed to particulate matter sprayed by the tire, for example, mud, dirt, sand, rocks, liquids, etc. Consistent and extensive exposure to such particulate matter leads to inaccurate sensor readings. As such, it is desirable that a sensor is suitably positioned to prevent exposure of the sensor to particulate matter sprayed by the tire.

Another disadvantage with existing temperature-monitoring devices is that they require installation of components that result in hindering tire removal or replacement. For example, temperature-monitoring devices that use conventional radio frequency networks for continuous or intermittent transmission of data may require installation of an additional antenna. The additional antenna may be installed only after removing the tire. Similarly, if the tire needs replacing, the antenna may have to be removed. As such, this unnecessarily complicates the process of tire removal or the process of installation of the sensing device. A sensing device or assembly, which is easy to install, is therefore required.

Hence, there is a long felt but unresolved need for a device, which instantaneously detects the temperature of the tire of the vehicle. Furthermore, there is a need for a device, comprising sensors suitably positioned to prevent exposure of the sensors to particulate matter sprayed by the tire. Moreover, there is a need for a device, comprising temperature sensors that is easy to install.

SUMMARY

This summary is provided to introduce a selection of concepts in a simplified form that are further disclosed in the detailed description of the present disclosure. This summary is not intended to identify key or essential inventive concepts of the claimed subject matter, nor is it intended for determining the scope of the claimed subject matter.

The sensing assembly, disclosed herein, for detecting a temperature of a tire of a vehicle includes a fender, one or more cavities, and at least one contactless temperature sensor. The fender includes an outer surface and an inner surface. The inner surface of the fender defines one or more cavities. The contactless temperature sensor is seated within each of the one or more cavities. Additionally, the contactless temperature sensor is configured to detect the temperature of the tire of the vehicle.

In accordance with another embodiment, the sensing assembly for detecting a temperature of a tire of a vehicle includes a fender, one or more cavities, and at least one contactless temperature sensor. The fender includes an inner surface and an outer surface with the inner surface of the fender defining one or more cavities. The one or more cavities extend radially outward from the inner surface of the fender. Further, each of the one or more cavities are inclined at an acute angle relative to a vertical axis of the tire and positioned away from a trajectory of particulate matter sprayed by the tire. The contactless temperature sensor is seated within each of the one or more cavities. Additionally, the contactless temperature sensor is positioned proximal to an upper end of the each of the one or more cavities for detecting the temperature of the tire of the vehicle.

In accordance with another embodiment, the sensing assembly for detecting a temperature of a tire of a motorcycle includes a fender, one or more cavities, protrusions, and at least one contactless temperature sensor. The fender includes an inner surface and an outer surface. The one or more cavities are formed in protrusions extending radially outward from an outer surface of the fender. Moreover, the protrusions are inclined at an acute angle relative to a vertical axis of the tire with the one or more cavities positioned away from a trajectory of particulate matter sprayed by the tire. The contactless temperature sensor is seated within each of the one or more cavities formed within the protrusions. Furthermore, the at least one contactless temperature sensor is positioned proximal to an upper end of the each of the one or more cavities for detecting the temperature of the tire of the motorcycle.

BRIEF DESCRIPTION OF THE DRAWINGS

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF THE PREFERRED EMBODIMENT

The sensing assembly, disclosed herein, is configured to detect a temperature of a tire of a vehicle. The sensing assembly may be used, inter alia, as a standalone detection component of the vehicle or as part of a tire pressure monitoring system of the vehicle. If used as the latter, the sensing assembly is configured to communicate to a central electronic unit, for example, an onboard computer, an electronic control unit (ECU), etc. The central electronic unit may analyze the data associated with a detected temperature. Since it is estimated that for every 10 degrees F. rise in temperature there is an increase of 1 psi of pressure, one or more suitable ranges of temperatures may be set as a "preset temperature range". As used herein, "preset temperature range" refers to a range of temperature that corresponds to an over inflation pressure range or an under-inflation pressure range. For example, if the recommended tire pressure ranges between 30 to 35 psi, a temperature range causing the tire pressure to rise above 35 psi would be termed as a "preset temperature range". Alternately, a temperature range causing the tire pressure to fall below 30 psi would also be termed as a "preset temperature range". The preset temperature range may be set different for different climatic zones, different tire manufacturers, and may be customized based on user preference.

Figure 1:
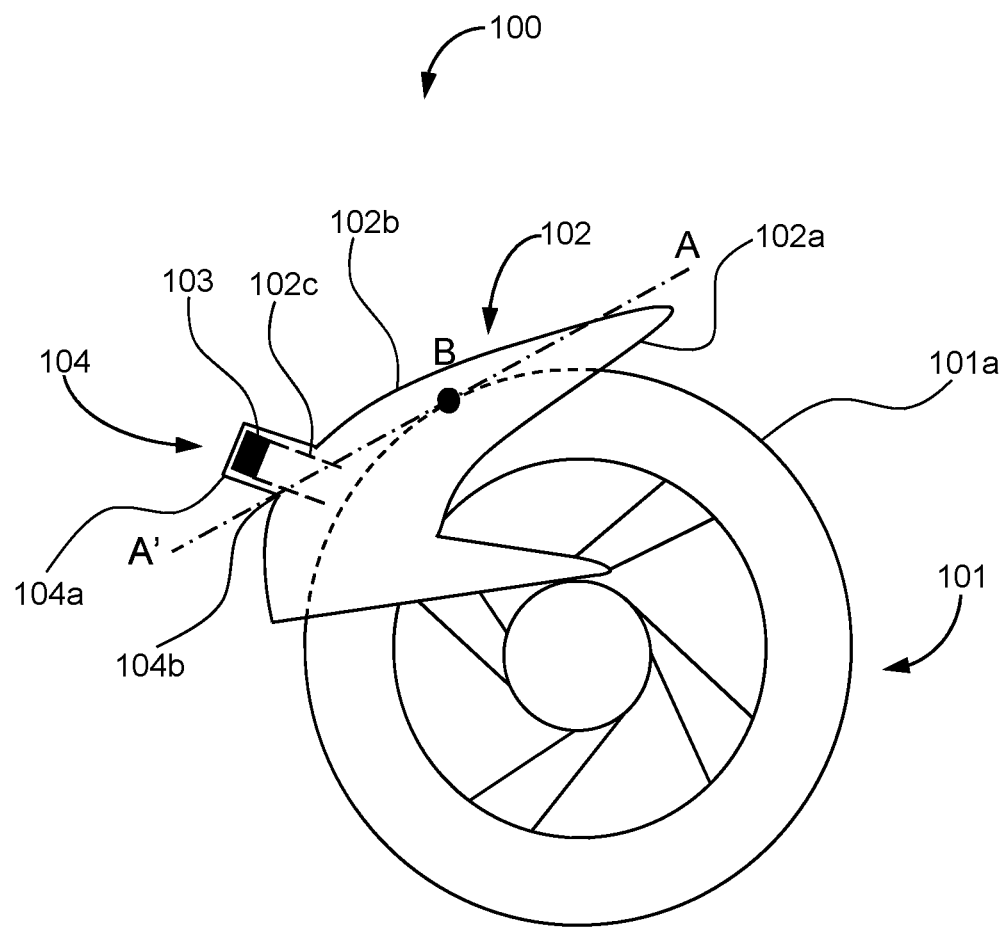
FIG. 1 exemplarily illustrates a side view of a sensing assembly.

Referring to FIG. 1, a side view of the sensing assembly 100 of a vehicle is disclosed. The sensing assembly 100 for detecting a temperature of a tire 101 of a vehicle comprises a fender 102, and at least one contactless temperature sensor 103. The sensing assembly 100 may be installed on vehicles including but not limited to, for example, cars, jeeps, buses, golf carts, all-terrain vehicles (ATVs), semi-trailer trucks, pickup trucks, motorbikes, scooters, etc. In accordance with an embodiment, one or more sensing assemblies 100 including the fenders 102 and the contactless temperature sensor 103 may be mounted on the vehicles. The fender 102 may be provided with the vehicle or as an aftermarket accessory. Various types of fenders 102 may be designed, for example, narrow fenders, bolt-on fenders (wider fenders with exposed bolts), cutout fenders (oversized fenders that require a fender trim), etc. Moreover, the fenders 102 may be made of materials such as fiberglass, Acrylonitrile butadiene styrene (ABS) plastic, metals, or the like. Several manufacturing processes may be utilized to form the fender 102, for example, injection molding, metal forming processes (bending, stamping, extrusion, forging, etc.), or the like.

In accordance with an embodiment, the fender 102 includes an inner surface 102a and an outer surface 102b. The inner surface 102a of the fender 102 defines one or more cavities 102c. In a preferred embodiment, the one or more cavities 102c causes one or more hollow protrusions 104 to extend radially outward from the outer surface 102b of the fender 102. In accordance with an embodiment, each of the one or more hollow protrusions 104 may be positioned at an acute angle relative to a vertical axis of the tire 101; the acute angle measured between vertical axis from the ground moving along the circumferential perimeter of the tire 101. In other words, location of the hollow protrusions 104 relative to the vertical axis is measured in a direction parallel to a length of the vehicle. Further, the cavities 102c are positioned away from a trajectory of particulate matter sprayed by the tire 101. As used herein, "particulate matter" refers to particles of liquid, mud, rock, and other particles sprayed by the tire 101. Further, the size of the particulate matter is not limited to microscopic particles suspended in the atmosphere. As such, the particulate matter may be construed to refer to particles of different sizes sprayed by the tire 101. Various types of fenders 102 may be designed with the hollow protrusions 104, for example, narrow fenders, bolt-on fenders (wider fenders with exposed bolts), cutout fenders (oversized fenders that require a fender trim), etc. Several manufacturing processes may be utilized to form the fender 102 with the extended hollow protrusion 104, for example, injection molding, metal forming processes (bending, stamping, extrusion, forging, etc.), or the like.

In accordance with an embodiment, the contactless temperature sensor 103 is seated within each of the one or more cavities 102c. Further, the contactless temperature sensor 103 is positioned proximal to an upper end 104a of the hollow protrusions 104 for detecting the temperature of the tire 101 of the vehicle. The hollow protrusions 104 extend radially outward from the outer surface 102b of the fender 102. Further, the hollow protrusions 104 are formed in the cylindrical configuration or in a conical-frustum shaped configuration. Alternately, the hollow protrusions 104 may be provided as a detachable component that may be attached and removed based on user preference. As such, the hollow protrusions 104 may be detachably attached to the fender 102 via fastening elements, for example, screw thread fasteners, interlocking fasteners, etc. In such cases, the cavities 102c defined by the inner surface 102a may be configured to align with the detachable hollow protrusions 104. It will be appreciated that the contactless temperature sensor 103 may be seated at various other sections of the cavities 102c formed in the hollow protrusions 104 based on utility or design requirements. In the preferred embodiment, the contactless temperature sensor 103 is, for example, an infrared (IR) sensor.

A basic design of the IR sensor may comprise a lens, an emissivity adjustment, a detector, and an ambient temperature compensation circuit. The lens serves to collect the energy produced by the target object (tire 101). The lens may be configured with additional selective filtration capabilities to allow the lens to filter through some type of atmospheric interference or other interference in the sight path. The emissivity adjustment calibrates the IR temperature probe to correspond with the emitting characteristics of the tire. The detector changes the collected energy to an electrical signal. Further, the ambient temperature compensation circuit ensures that temperature differences within the IR temperature sensor, caused by ambient changes, are not transmitted to the final output. In addition, the IR sensor may incorporate amplifying circuits to amplify the generated electrical signals. Although, the IR temperature sensor is used in the preferred embodiment of the current disclosure, it will be appreciated that several other contactless temperature sensors may be implemented based on size, design, and utility constraints or requirements.

In accordance with an embodiment, the hollow protrusions 104 comprise an upper end 104a and a lower end 104b as exemplarily illustrated in FIG. 1. The contactless temperature sensor 103 is positioned above a tangential line A-A' between a lower end 104b of the hollow protrusion 104 and an external surface 101a of the tire 101 of the vehicle. As exemplarily illustrated in FIG. 1, the tangential line AA' meets the external surface 101a of the tire 101 at B. The position of the contactless temperature sensor 103 prevents the contactless temperature sensor 103 from being exposed to particulate matter sprayed by the tire 101. Irrespective of the terrain in which the vehicle is driven, since the contactless temperature sensor 103 is seated within the hollow protrusion 104 and above the tangential line AA'; particulate matter may not reach the contactless temperature sensor 103. The contactless temperature sensor 103 may draw power from a power source, such as a battery or the like. The sensing assembly 100 may be implemented in different types of vehicles, for example, autonomous vehicles, semi-autonomous vehicles, non-autonomous vehicles, etc., as part of the on board electronic systems. Other examples of vehicles include electric powered vehicles, hybrid vehicles, conventionally powered vehicles (petrol, diesel, etc.), renewable energy powered vehicles or the like.

Figure 2:
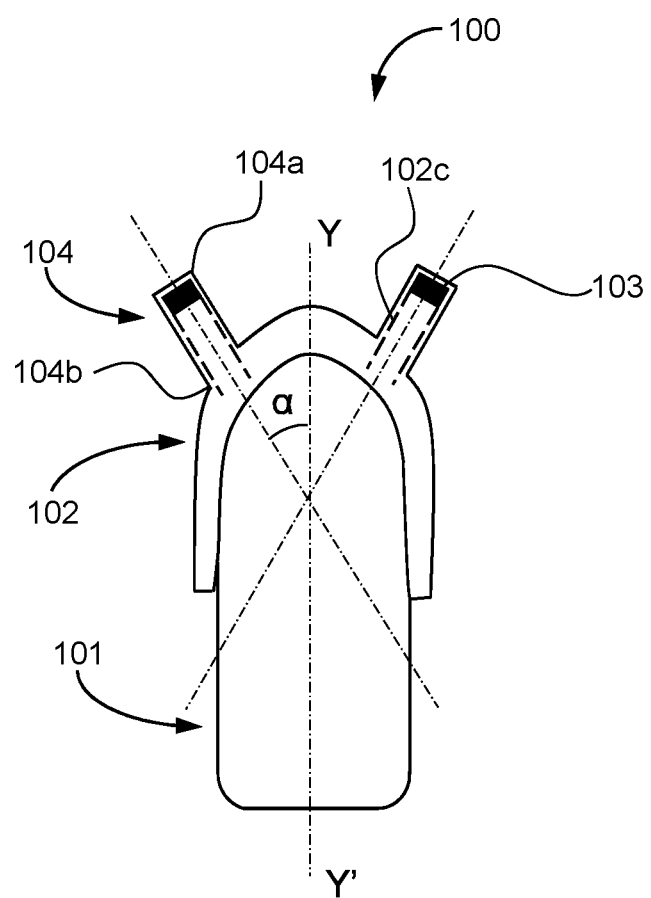
FIG. 2 exemplarily illustrates a rear view of a sensing assembly.

FIG. 2 exemplarily illustrates a rear view of a sensing assembly 100. The sensing assembly 100 for detecting a temperature of the tire 101 of the motorcycle comprises a fender 102 and at least one contactless temperature sensor 103. The fender 102 comprises one or more cavities 102c formed in hollow protrusions 104. The contactless temperature sensor 103 is seated within each of the one or more cavities 102c. Additionally, the contactless temperature sensor 103 is positioned proximal to an upper end 104a of the hollow protrusions 104 for detecting the temperature of the tire 101 of the motorcycle. The hollow protrusions 104 are inclined at an angle α (alpha) towards the tire 101 on either side of the vertical axis Y-Y'. Such an arrangement contributes to sensor redundancy thereby improving reliability of the measurement of the contactless temperature sensor 103. As used herein, "sensor redundancy" refers to the provision of additional or multiple resources (sensors) to generate similar results thereby providing a more accurate measurement of the measured quantity (temperature of the tire 101).

In the preferred embodiment, two contactless temperature sensors 103 are provided to measure temperature of the tire 101 of the motorcycle, as exemplarily illustrated in FIG. 2. However, an array of contactless temperature sensors 103 may be provided to contribute to sensor redundancy. The contactless temperature sensor 103 may additionally comprise a communication unit or module configured to transmit the detected temperature to an onboard computing device. In accordance with an embodiment, the contactless temperature sensor 103 may also comprise a wakeup timer provided with set time intervals for operating in a transmission mode or a standby mode. The contactless temperature sensor 103 may be configured to operate in a standby mode when the contactless temperature sensor 103 does not transmit data. However, when the set time interval is crossed, the wakeup timer actuates the contactless temperature sensor 103 to operate in a transmitting mode. Again, when the set time interval for operating in a transmitting mode is crossed, the contactless temperature sensor 103 operates in a standby mode. Such an operation of the contactless temperature sensor 103 reduces power usage of the contactless temperature sensor 103. In another embodiment, contactless temperature sensor 103 can be activated over a predefined speed of the vehicle. It may also be appreciated that any kind of sensors, for example, a tire profile monitoring visual sensor, tire wear measurement sensors, speed monitoring sensors can be housed within the one or more cavities 102c.

In a preferred embodiment, the hollow protrusions 104 extend radially outward from an outer surface of the fender 102. Further, the hollow protrusions 104 are inclined at an acute angle α relative to a vertical axis Y-Y' of the tire 101, as exemplarily illustrated in FIG. 2. The inclination of the hollow protrusions 104 relative to the vertical axis Y-Y' is measured in a direction parallel to a width of the motorcycle.

Figure 3:
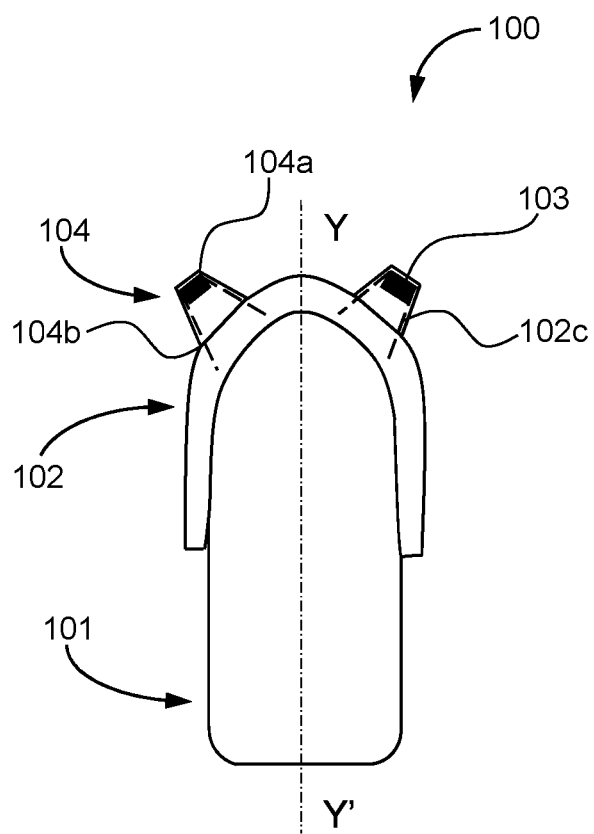
FIG. 3 exemplarily illustrates a rear view of a sensing assembly according to an alternate embodiment of the present disclosure.

FIG. 3 exemplarily illustrates a rear view of a sensing assembly 100 according to another embodiment of the present disclosure. The sensing assembly 100 for detecting a temperature of the tire 101 of the motorcycle comprises a fender 102 and at least one contactless temperature sensor 103. One or more cavities 102c are formed in the hollow protrusions 104. In accordance with an embodiment, the hollow protrusions 104 are designed to conform to the conical frustum-shaped configuration as exemplarily illustrated in FIG. 3. The hollow protrusions 104 comprise an upper end 104a and a lower end 104b. In an embodiment, a diameter of the cavity 102c proximal to a lower end 104b of the hollow protrusion 104 is greater than a diameter of the cavity 102c proximal to an upper end 104a of the hollow protrusion 104. As the diameter of the cavity 102c expands downward, the sensing area of the contactless temperature sensor 103 increases thereby improving accuracy of the measurement.

The contactless temperature sensor 103 of the sensing assembly 100 is further configured to transmit a wireless signal comprising data associated with the detected temperature to a processor of a tire pressure monitoring system of the vehicle based on the detected temperature falling within a preset temperature range. The processor may be, for example, a Reduced Instruction Set Computing (RISC) processor, an Application-Specific Integrated Circuit (ASIC) processor, a Complex Instruction Set Computing (CISC) processor, a microcontroller, a central processing unit (CPU), a graphics processing unit (GPU), etc. In an embodiment, a combination of multiple processors may also be used.

When the sensing assembly 100 is implemented as a component or accessory of the tire pressure monitoring system of the vehicle, the contactless temperature sensor 103 communicates with a processor of the central electronic unit or the onboard computing device. In accordance with an embodiment, the contactless temperature sensor 103 transmits the wireless signal over an in-vehicle communications network. The in-vehicle communications network may include, for example, a controller area network (CAN), a Bluetooth Low Energy (BLE) network, a vehicle area network (VAN), Domestic Digital Bus ($D^2B$), Time-Triggered Protocol (TTP), Flex Ray, IEEE 1394, Carrier Sense Multiple Access With Collision Detection (CSMA/CD) based data communication protocol, Inter-integrated Circuit (I2C), Inter Equipment Bus (IEBus), Society of Automotive Engineers, (SAE) J1708, SAE J1939, International Organization for Standardization (ISO) 11992, ISO 11783, Power-line communication (PLC), Plastic Optic Fiber (POF), Serial Peripheral Interface (SPI) bus, Local Interconnect Network (LIN), etc. The contactless temperature sensor 103 may be configured to transmit data associated with the temperature continuously or at regular intervals. The user may set the time intervals in which the data must be transmitted using the wakeup timer as described earlier.

Alternately, the contactless temperature sensor 103 may be configured to transmit the data associated with the detected temperature only when the detected temperature falls within the preset temperature range. For example, if the preset temperature range is set as 120 to 160 degrees Fahrenheit and the detected temperature falls in the preset temperature range, then the contactless temperature sensor 103 transmits the data to the processor. The tire pressure monitoring system may also comprise an analyzing module configured to analyze the received temperature to determine whether the tire pressure is at a level that can cause a tire blowout or premature failure of the tire 101. Once the processor considers the temperature of the tire 101 as sufficient to cause the tire blowout, the processor may generate an alert or a notification configured to be displayed via a display device to the user. The display device may comprise an in-vehicle infotainment device, an electronic device, a handheld device, a tablet device, etc. In an embodiment, the processor may be configured to generate an audio alert or notification via an audio interface. The audio interface may include audio devices such as speakers or the like.

In accordance with an embodiment, the sensing assembly 100 may be implemented in a vehicle that is part of an autonomous fleet. As such, the contactless temperature sensor 103 may be configured to transmit the data associated with the detected temperature to a remote server or fleet management system via a wireless communication network. The wireless communication network may include, but are not limited to, a Wide Area Network (WAN), a cellular network, such as a 3G, 4G, or 5G network, an Internet-based mobile ad hoc networks (IMANET), etc. The remote server or fleet management system may further be configured to analyze the received data and transmit alerts or notifications to vehicles of the autonomous fleet. For instance, the data associated with the temperature of the tire 101 of a vehicle that corresponds to a blowout tire pressure may be analyzed and notifications may be subsequently transmitted to on board computing systems of proximal vehicles to avoid collisions.

The sensing assembly 100 assists a rider or an operator of a vehicle in monitoring the temperature of the tire 101. For example, with optimal tire temperature, incidence of uneven wear is reduced, improved grip is achieved, etc., translating to better braking and general performance of the tire 101. In racing circuits, the condition of the tire 101 in conjunction with the driving style of the rider contribute to the performance of the vehicle. A set of well-maintained tires can provide a similar hike in performance supplied by a more powerful engine. In such conditions, the temperature of the tires 101 detected by the sensing assembly 100 may provide valuable information to the driver regarding the condition of the tires 101, thereby allowing the driver to alter his/her driving style suitably. As a result, the rider ensures that an optimal temperature of the tire 101 is maintained. This contributes to improved tire life, better tire performance, and improved overall performance of the vehicle.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto. Additionally, the features of various implementing embodiments may be combined to form further embodiments of the invention.

What is claimed is:

1. A sensing assembly, for detecting a temperature of a tire of a vehicle, the sensing assembly comprising:
    a fender comprising an outer surface and an inner surface, the inner surface of the fender defining one or more cavities; and
    at least one contactless temperature sensor seated within each of the one or more cavities, the at least one contactless temperature sensor configured to detect the temperature of the tire of the vehicle.

2. The sensing assembly according to claim 1, wherein the one or more cavities are inclined at an acute angle relative to a vertical axis of the tire.

3. The sensing assembly according to claim 1, wherein the one or more cavities are formed within protrusions extending radially outward from the outer surface of the fender.

4. The sensing assembly according to claim 3, wherein the protrusions are inclined at an acute angle relative to a vertical axis of the tire.

5. The sensing assembly according to claim 3, wherein the protrusions are of one of a cylindrical configuration and a conical frustum-shaped configuration.

6. The sensing assembly according to claim 1, wherein the at least one contactless temperature sensor is positioned above a tangential line between a lower end of the one or more cavities and an external surface of the tire of the vehicle.

7. The sensing assembly according to claim 1, wherein the at least one contactless temperature sensor is an infrared temperature sensor.

8. A sensing assembly, for detecting a temperature of a tire of a vehicle, the sensing assembly comprising:
    a fender comprising an inner surface and an outer surface, the inner surface defining one or more cavities extending radially outward from the inner surface of the fender, each of the one or more cavities inclined at an acute angle relative to a vertical axis of the tire and positioned away from a trajectory of particulate matter sprayed by the tire; and
    at least one contactless temperature sensor seated within each of the one or more cavities, the at least one contactless temperature sensor positioned proximal to an upper end of the each of the one or more cavities for detecting the temperature of the tire of the vehicle.

9. The sensing assembly according to claim 8, wherein the one or more cavities are formed within protrusions extending radially outward from the outer surface of the fender.

10. The sensing assembly according to claim 9, wherein the protrusions are inclined at an acute angle relative to a vertical axis of the tire.

11. The sensing assembly according to claim 9, wherein the protrusions are of one of a cylindrical configuration and a conical frustum-shaped configuration.

12. The sensing assembly according to claim 8, wherein a diameter of a lower end of the one or more cavities proximal to the outer surface of the fender is greater than a diameter of an upper end of the one or more cavities distal to the outer surface of the fender.

13. The sensing assembly according to claim 8, wherein the at least one contactless temperature sensor is positioned above a tangential line between a lower end of the one or more cavities and an external surface of the tire of the vehicle.

14. The sensing assembly according to claim 8, wherein the at least one contactless temperature sensor is an infrared temperature sensor.

15. A sensing assembly, for detecting a temperature of a tire of a motorcycle, the sensing assembly comprising:
    a fender comprising an inner surface and an outer surface;
    one or more cavities formed in protrusions, the protrusions extending radially outward from the outer surface of the fender and inclined at an acute angle relative to a vertical axis of the tire, wherein the one or more cavities are positioned away from a trajectory of particulate matter sprayed by the tire; and
    at least one contactless temperature sensor seated within each of the one or more cavities, the at least one contactless temperature sensor positioned proximal to an upper end of the each of the one or more cavities for detecting the temperature of the tire of the motorcycle.

16. The sensing assembly according to claim 15, wherein the at least one contactless temperature sensor is further configured to transmit a wireless signal comprising data associated with the detected temperature to a processor of a tire pressure monitoring system of the vehicle based on the detected temperature falling within a preset temperature range.

17. The sensing assembly according to claim 15, wherein the protrusions are of one of a cylindrical configuration and a conical frustum-shaped configuration.

18. The sensing assembly according to claim 15, wherein a diameter of a lower end of the one or more cavities proximal to the outer surface of the fender is greater than a diameter of an upper end of the one or more cavities distal to the outer surface of the fender.

19. The sensing assembly according to claim 15, wherein the at least one contactless temperature sensor is positioned above a tangential line between a lower end of the one or more cavities and an external surface of the tire of the motorcycle.

20. The sensing assembly according to claim 15, wherein the at least one contactless temperature sensor is an infrared temperature sensor.

* * * * *